US012669612B2

(12) United States Patent
Rakuljic et al.

(10) Patent No.: US 12,669,612 B2
(45) Date of Patent: Jun. 30, 2026

(54) PHOTONIC INTEGRATED CIRCUIT, LIGHT DETECTION AND RANGING SYSTEM AND METHOD FOR OPERATING THE SAME

(71) Applicant: Intel Corporation, Santa Clara, CA (US)

(72) Inventors: George Rakuljic, Santa Monica, CA (US); Naresh Satyan, Pasadena, CA (US); Yaakov Vilenchik, Jerusalem (IL); Ron Friedman, Givat Oz (IL); Daniel Grodensky, Binyamina (IL); Israel Petronius, Haifa (IL); Amnon Yariv, Pasadena, CA (US)

(73) Assignee: Intel Corporation, Santa Clara, CA (US)

( * ) Notice: Subject to any disclaimer, the term of this patent is extended or adjusted under 35 U.S.C. 154(b) by 998 days.

(21) Appl. No.: 17/640,343

(22) PCT Filed: Sep. 25, 2020

(86) PCT No.: PCT/US2020/052601
§ 371 (c)(1),
(2) Date: Mar. 4, 2022

(87) PCT Pub. No.: WO2021/133445
PCT Pub. Date: Jul. 1, 2021

(65) Prior Publication Data
US 2022/0342078 A1      Oct. 27, 2022

Related U.S. Application Data

(60) Provisional application No. 62/954,012, filed on Dec. 27, 2019.

(51) Int. Cl.
*G01S 17/93* (2020.01)
*G01S 7/481* (2006.01)
(Continued)

(52) U.S. Cl.
CPC .......... *G01S 17/931* (2020.01); *G01S 7/4814* (2013.01); *G02B 6/12004* (2013.01);
(Continued)

(58) Field of Classification Search
CPC ............... G01S 17/931; G01S 17/4814; G02B 6/12004; G02B 6/12007; G02B 2006/12107; G02B 2006/12138
(Continued)

(56) References Cited

U.S. PATENT DOCUMENTS

| | | | | |
|---|---|---|---|---|
| 2015/0378187 A1* | 12/2015 | Heck | ....................... | G02F 1/292 |
| | | | | 250/227.21 |
| 2018/0052378 A1* | 2/2018 | Shin | ........................ | G02F 1/292 |

(Continued)

FOREIGN PATENT DOCUMENTS

WO          2019014596 A1      1/2019

OTHER PUBLICATIONS

Search Report for the international application No. PCT/US2020/052601, mailed on Jan. 19, 2021, 4 pages (For reference purposes only).
(Continued)

*Primary Examiner* — Jerry M Blevins
(74) *Attorney, Agent, or Firm* — Viering, Jentschura & Partner mbB

(57) ABSTRACT

A photonic integrated circuit, comprising a semiconductor photonic substrate having integrated therein: at least one light receiving input; at least one optical splitter to branch light received at the at least one light receiving input to a first light path and a second light path; wherein, the photonic integrated circuit, in the first light path, includes: at least one first amplifier structure to amplify the light in the first light path to provide first amplified light; at least one first light output to output the first amplified light from the at least one
(Continued)

first amplifier structure; and at least one first photo detector to receive light from the outside of the photonic integrated circuit, the at least one first photo detector being located next to the at least one first light output; wherein, the photonic integrated circuit, in the second light path, includes: at least one second amplifier structure to amplify the light in the second light path to provide second amplified light; at least one second light output to output the second amplified light from the at least one second amplifier structure; and at least one second photo detector to receive light from the outside of the photonic integrated circuit, the at least one second photo detector being located next to the at least one second light output.

25 Claims, 6 Drawing Sheets

(51) Int. Cl.
G01S 17/931 (2020.01)
G02B 6/12 (2006.01)
(52) U.S. Cl.
CPC .................... G02B 6/12007 (2013.01); G02B 2006/12107 (2013.01); G02B 2006/12138 (2013.01)

(58) Field of Classification Search
USPC ........................................................... 385/14
See application file for complete search history.

(56) References Cited

U.S. PATENT DOCUMENTS

| | | |
|---|---|---|
| 2018/0306925 A1 | 10/2018 | Hosseini et al. |
| 2019/0004151 A1 | 1/2019 | Abediasl et al. |
| 2019/0011558 A1* | 1/2019 | Crouch .................... G08G 1/16 |
| 2019/0062963 A1 | 2/2019 | Heiner et al. |
| 2019/0101647 A1 | 4/2019 | Feshali et al. |
| 2020/0209358 A1* | 7/2020 | Maleki ................... G01S 17/93 |

OTHER PUBLICATIONS

Supplementary Search Report issued for the parallel European patent application No. 20 90 5245, dated Jan. 30, 2024, 8 pages (for informational purposes only).
J.M., Paul., et al., "Photonic integrated Circuit FMCW Lidar on a Chip", retreived from https://www.semanticscholar.org/paper/Photonic-Integrated-Circuit-FMCW-Lidar-On-A-Chip-Suni-Colosimo/0a47ca029bbbf11cacfc7c1f08338b7be95f4c5d, on Sep. 8, 2025, 7 pages.

* cited by examiner

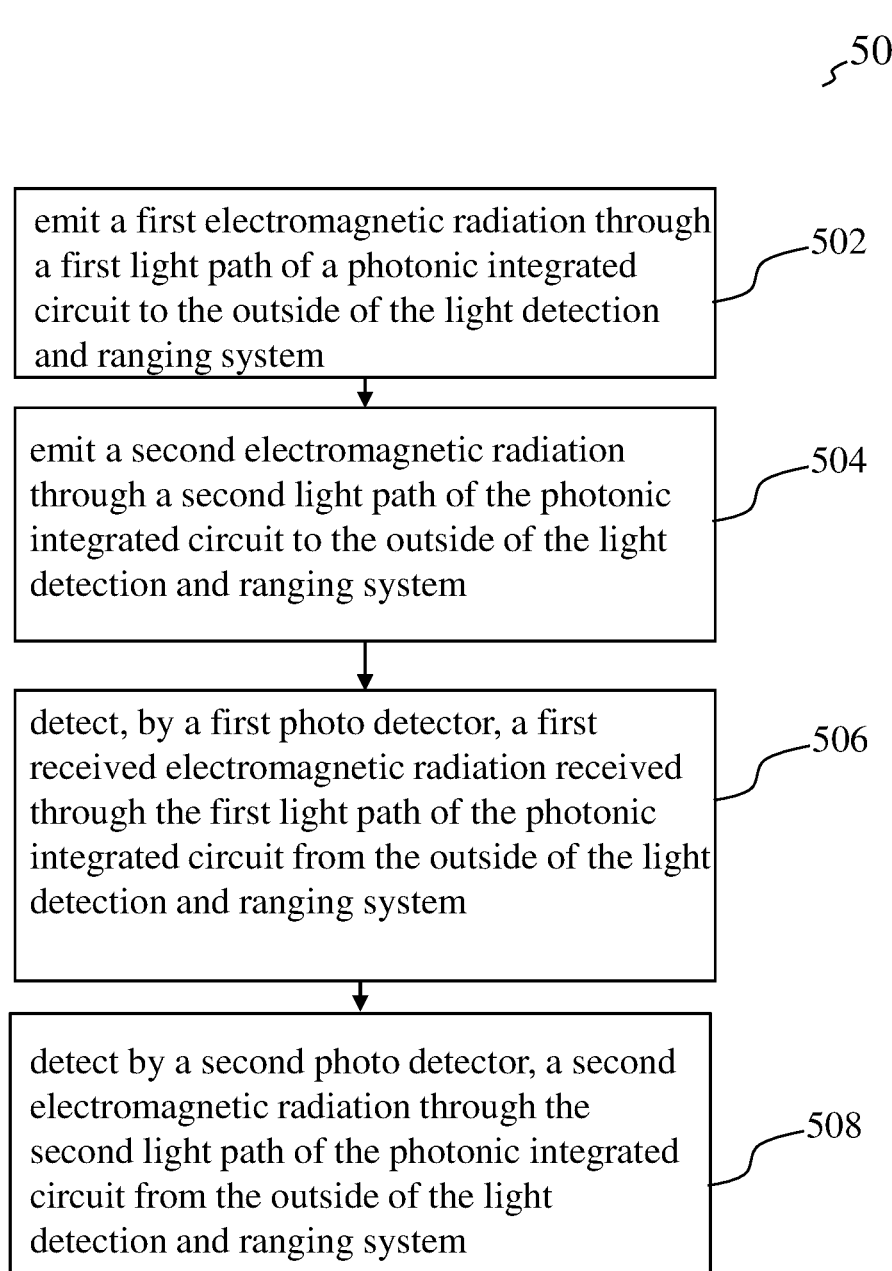

~500 emit a first electromagnetic radiation through a first light path of a photonic integrated circuit to the outside of the light detection and ranging system — 502 emit a second electromagnetic radiation through a second light path of the photonic integrated circuit to the outside of the light detection and ranging system — 504 detect, by a first photo detector, a first received electromagnetic radiation received through the first light path of the photonic integrated circuit from the outside of the light detection and ranging system — 506 detect by a second photo detector, a second electromagnetic radiation through the second light path of the photonic integrated circuit from the outside of the light detection and ranging system — 508

FIG. 5

PHOTONIC INTEGRATED CIRCUIT, LIGHT DETECTION AND RANGING SYSTEM AND METHOD FOR OPERATING THE SAME

RELATED APPLICATION(S)

This application is a US National Stage Application, filed under 35 U.S.C. § 371, of International Patent Application No. PCT/US2020/052601, filed on Sep. 25, 2020, and claims priority to U.S. Provisional Patent Application 62/954,012 filed on Dec. 27, 2019, the contents of which are incorporated by reference herein in its entirety.

TECHNICAL FIELD

Various aspects of this disclosure generally relate to the field of light detection and ranging systems.

BACKGROUND

Coherent of light detection and ranging (LIDAR) is desirable for autonomous vehicles due to its inherent immunity to optical interference and ability to detect both the range and range-rate (relative velocity of a target) to a target. Notwithstanding these attributes, a coherent LIDAR system must still provide a long range detection capability (>200 m) and a high data rate (>1M pixels/s) with high optical resolution (>100 vertical pixels) to be commercially viable. Unfortunately, the performance of a coherent LIDAR, is negatively affected by time-of-flight (TOF) limitations on the detection process and fluctuating (Swerling II) target effects due to speckle.

The TOF limitation restricts the data rate of a coherent LIDAR system imposed by the finite speed of light and the need for multiple chirps to resolve Doppler ambiguity. For example, for a maximum range of 300 m, the data rate of a single optical channel (laser beam) is limited to 0.25 M pixels/s. Due to speckle, targets appear to fluctuate in a coherent LIDAR system, and the signal-to-noise-ratio (SNR) required for high probability detection can be more than 10 dB greater than for non-fluctuating targets. Without mitigation, a 10 dB SNR penalty would reduce the range of detection of a coherent LIDAR by a factor of 3 compared to an incoherent system.

The key to speckle mitigation, and to regaining the range performance in a coherent LIDAR, is to obtain multiple measurements over each scene pixel during each scan of the field of view, and then incoherently integrate them to mitigate the target fluctuations. The drawback is a further reduction in data rate by a factor of 2 or more, depending on the number of measurements to be integrated.

A Photonic Integrated Circuit (PIC) is desirable for coherent LIDAR due to the promise of low cost and scalability to high volume. However, due to PIC limitations (size, yield, cost), the number of vertical channels (resolution elements) is limited (~10's) and does not easily scale.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the invention. In the following description, various aspects of the invention are described with reference to the following drawings, in which:

FIG. 5 illustrates a flow diagram of method of operating a light detection and ranging system according to various aspects.

DESCRIPTION

The following detailed description refers to the accompanying drawings that show, by way of illustration, specific details and aspects in which the invention may be practiced.

The word "exemplary" is used herein to mean "serving as an example, instance, or illustration". Any aspect or design described herein as "exemplary" is not necessarily to be construed as preferred or advantageous over other aspects or designs.

Figure 1:
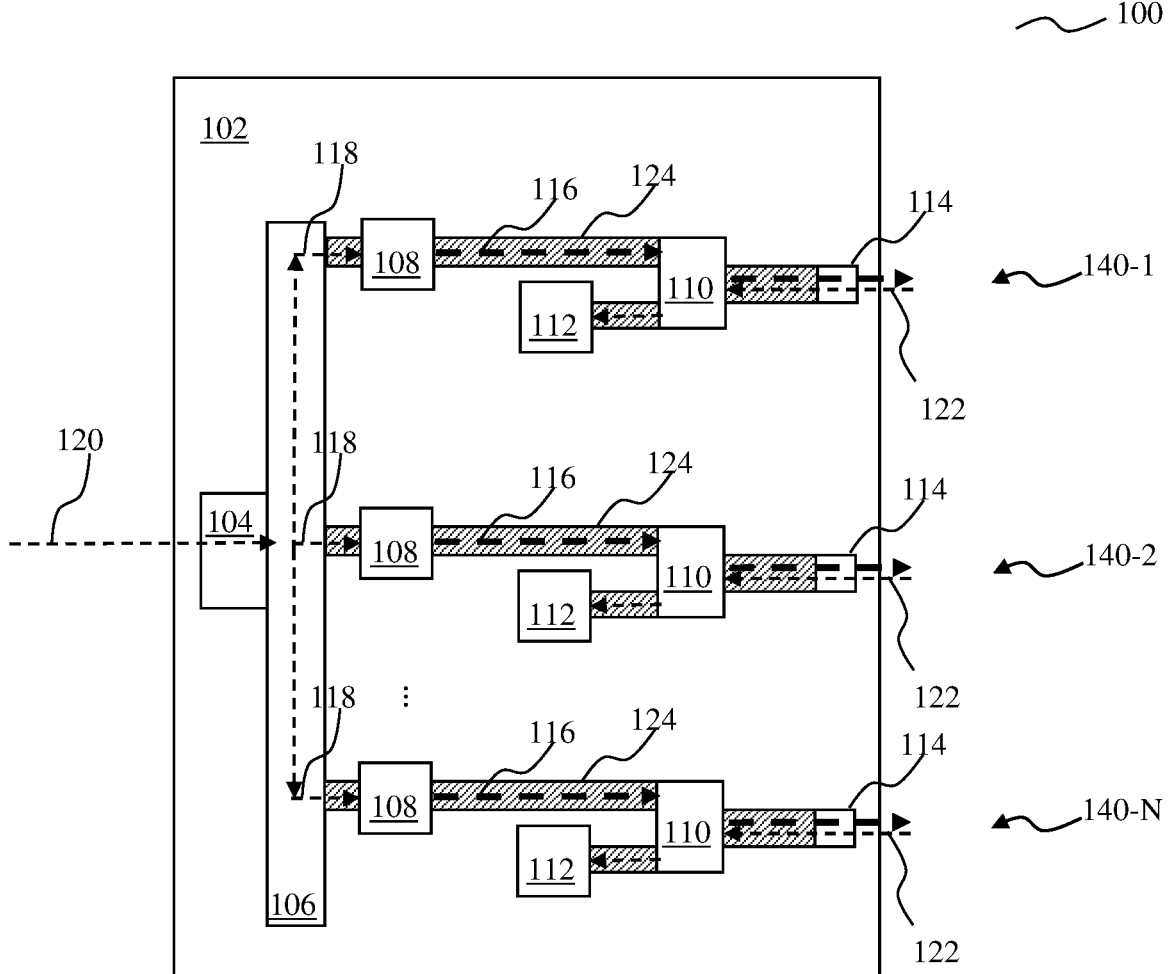
FIG. 1 illustrates a schematic diagram of a photonic integrated circuit according to various aspects.

FIG. 1 illustrates a schematic diagram of a photonic integrated circuit (PIC) 100 according to various aspects. The photonic integrated circuit 100 may include a semiconductor photonic substrate 102 having integrated therein at least one light receiving input 104 and at least one optical splitter 106 to branch 118 light 120 received at the at least one light receiving input 104 to a first light path 140-1 and a second light path 140-2.

The photonic integrated circuit 100 may include further light paths 140-N with N being a rational number. In other words, the photonic integrated circuit 100 may include a plurality of light paths 140-N equal or similar configured like the first and second light path 140-1/140-2. Thus, as example, multiple (>10) vertical optical channels operating in parallel may be provided. Hence, a high (>1M pixels/s) overall or effective data rate may be enabled. The number of PIC channels to increase the number of vertical resolution elements (or reduce the cost by using fewer or smaller PICs) is readily scalable. The coherent LIDAR implemented on a silicon PIC will (uniquely) enable the high performance and pricing required by customers for autonomous vehicle applications.

The semiconductor photonic substrate 102 may be made of a semiconductor material, e.g. silicon. The semiconductor photonic substrate 102 may be common substrate, e.g. at least for the plurality of light paths. The term "integrated therein" may be understood as formed from the material of the substrate and, thus, may be different to the case in which elements are formed, arranged or positioned on top of a substrate.

The photonic integrated circuit 100, in the first light path 140-1 may include at least one first amplifier structure 108 to amplify the light 118 in the first light path 140-1 (e.g. directly or indirectly from the at least one optical splitter 106) to provide first amplified light 116; at least one first light output 114 to output the first amplified light 116 from the at least one first amplifier structure 108; and at least one first photo detector 112 to receive light 122 from the outside of the photonic integrated circuit 100. The at least one first photo detector 112 may be located next to the at least one first light output 114, e.g. integrated in the common semiconductor photonic substrate 102. The photonic integrated circuit 100, in the second light 140-2, may include at least one second amplifier structure 108 to amplify the light 118 in the second light path 140-2 (e.g. directly or indirectly from the at least one optical splitter 106) to provide second amplified light 116; at least one second light output 114 to output the second amplified light 116 from the at least one second amplifier structure 108; and at least one second photo detector 112 to receive light 122 from the outside of the photonic integrated circuit 100. The at least one second photo detector 112 may be located next to the at least one second light output 114, e.g. integrated in the common semiconductor photonic substrate 102.

In various aspects, "located next" may be interpreted as formed in or on the same (a common) semiconductor photonic substrate 102.

The at least one first light output 114 and the at least one first photo detector 112 may be arranged on the same side of the photonic integrated circuit 100. Alternatively or in addition, the at least one second light output 114 and the at least one second photo detector 112 may be arranged on the same side of the photonic integrated circuit 100.

The at least one first photo detector 112 may include a first photo diode. Alternatively or in addition, the at least one second photo detector 112 may include a second photo diode.

The photonic integrated circuit 100, in the first light path 140-1, may include at least one first waveguide structure 124. Alternatively or in addition, the second light path 140-2 may include at least one second waveguide structure 124. A waveguide structure 124 may be in the form of a strip line or micro strip line. However, a waveguide structure 124 may also be a planar waveguide. The waveguide structure 124 may be configured to guide an electromagnetic radiation emitted from a light source couple to the input 104 to the output 114. The waveguide structure 124 may be formed from the material of the semiconductor photonic substrate 102. In the first light path 140-1, the photonic integrated circuit may include at least one first waveguide structure 124 and in the second light path 140-2 may include at least one second waveguide structure 124 that may be optically isolated. The first waveguide structure 124 and the second waveguide structure 124 may be optically isolated from each other. The at least one first waveguide structure 124 may be formed from semiconductor photonic substrate 102. Alternatively or in addition, the at least one second waveguide structure 124 may be formed from semiconductor photonic substrate 102.

The photonic integrated circuit 100, in the first light path 140-1, may include at least one optical splitter 110 to branch light 116 received from the at least one light receiving input 104 to the at least one first photo detector 112 and to the first light output 114. Alternatively or in addition, the second light path 140-2 may include at least one optical splitter 110 to branch light 116 received from the at least one light receiving input 104 to the at least one second photo detector 112 and to the second light output 114.

The light receiving input 104 may include an optical coupler configured to optically interconnect an electromagnetic radiation source outside of the semiconductor photonic substrate (e.g. an external electromagnetic radiation source) to the at least one optical splitter.

The at least one first photo detector 112 of the first light path 140-1 and/or the at least one second photo detector 112 of the second light path 140-2 are/is an individual photo detector 112. The photo detector 112 of different light paths may be optically isolated from each other and/or may be addressable independently from each other. In other words, the photo detectors 112 of different light paths may be configured to detect light from the outside of the PIC 100 independently from each other.

Figure 4:
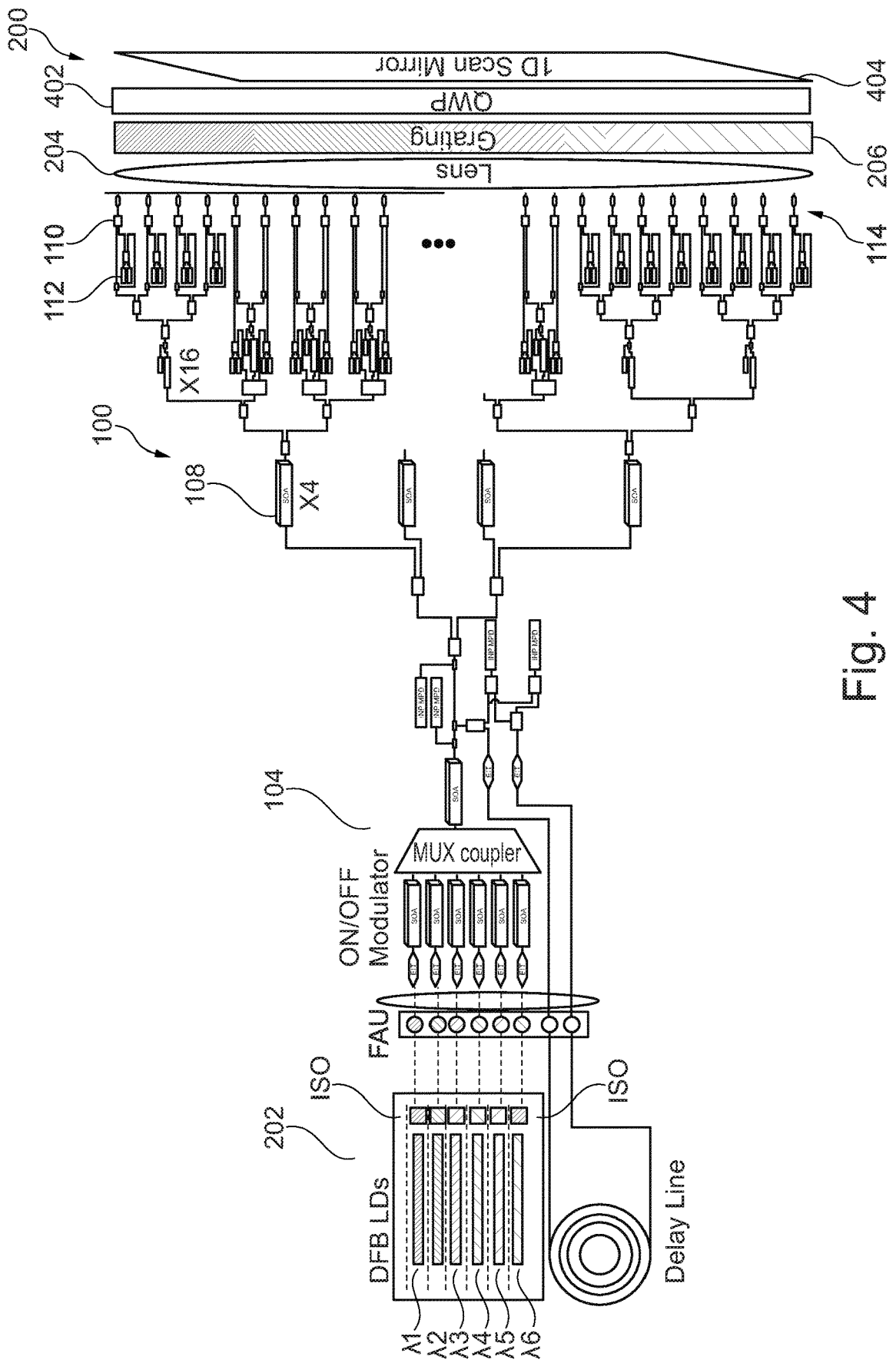
FIG. 4 illustrates a light detection and ranging system according to various aspects.

The photonic integrated circuit 100, in the first light path 140-1, may include at least one balanced photo detector pair (illustrated in FIG. 4). Alternatively or in addition, the second light path 140-2 may include at least one balanced photo detector pair. The photo detector pair may be used to reduce an impact of electronic noise on the detected signal.

The first amplifier structure 108 may include a semiconductor optical amplifier 108 (SOA) and/or the second amplifier structure 108 may include a semiconductor optical amplifier 108 (SOA).

In various aspects, the photonic integrated circuit 100 may include a plurality of waveguide structures 124 on a common semiconductor photonic substrate 102 (of different light paths), and a plurality of photo detectors 112 on the same semiconductor photonic substrate 102. Each waveguide structure 124 of the plurality of waveguide structures 124 may be coupled to at least one photo detector 112 of the plurality of photo detectors 112, such that photo detectors 112 coupled to different waveguide structure 124 may be addressable independently from each other. In other words, the photo detectors 112 of the plurality of light paths 140-N may be individual photo detectors 112.

The at least one optical splitter 106 may be configured to branch light received at the at least one light receiving input 104 to a plurality of light paths 140-N. In each light path of the plurality of light paths 140-N, the photonic integrated circuit 100 may include at least one amplifier structure 108 to amplify the light in the light path to provide an amplified light 116; at least one light output 114 to output the amplified light 116 from the photonic integrated circuit 100; and at least one photo detector 112 to receive light 122 from the outside of the photonic integrated circuit 100, the at least one photo detector 112 being located next to the at least one light output 114.

In various aspects a photonic integrated circuit 100 may include a semiconductor photonic substrate 102 having integrated therein at least one light receiving input 104; at least one optical splitter 106 to branch light 118 received at the at least one light receiving input 104 to a plurality of waveguide structures 124. The semiconductor photonic substrate 102 further having integrated therein a plurality of photo detectors 112. Each waveguide structure 124 of the plurality of waveguide structures 124 is coupled to at least one photo detector 112 of the plurality of photo detectors 112. The semiconductor photonic substrate 102 further having integrated therein at least one light output structure optically coupled to the plurality of waveguide structures 124. The light output structure is configured to output light 122 from the plurality of waveguide structures 124 to the outside of the photonic integrated circuit 100. Each photo detector 112 connected to at least one of the waveguide structures 124 receives light from the outside of the photonic integrated circuit 100 through the waveguide structure 124 and the light output structure. The light output structure may include a plurality of light outputs 114.

Figure 2:
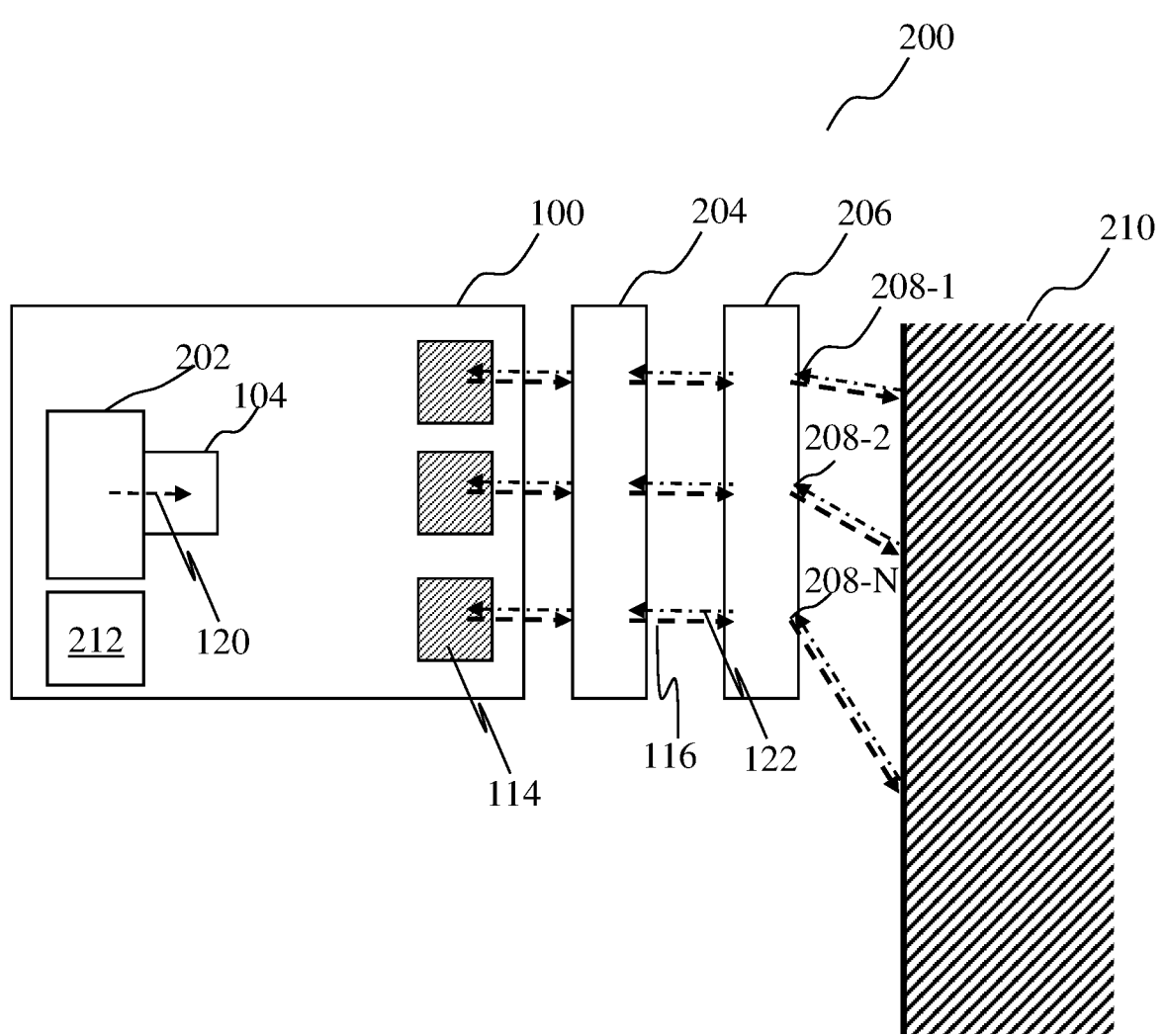
FIG. 2 illustrates a light detection and ranging system according to various aspects.

FIG. 2 illustrates a schematic diagram of a light detection and ranging system 200 according to various aspects. The light detection and ranging system 200 may include a photonic integrated circuit 100 as described above, e.g. having a plurality of waveguide structures 124; and a plurality of optical photo detectors 112; wherein each waveguide structure 124 of the plurality of waveguide structures 124 may be configured to output light 116 from the photonic integrated circuit 100 and wherein each of the optical photo detectors 112 may be configured to receive light 122 from the outside of the photonic integrated circuit 100, the photo detector 112 being located next to an associated light output 114.

The light detection and ranging system 200 may include an electromagnetic radiation source 202 (also denoted as light source 202) that provides an electromagnetic radiation 120 to the input 104 of the PIC 100. The light source 202 may be formed or integrated in the semiconductor photonic substrate 102. Alternatively, the light source 202 may external to the PIC 100 but optically coupled to the input 104. The light source 202 may be configured to emit electromagnetic radiation of different frequencies. This way, by using wavelength multiplexing of spatially parallel optical channels in a PIC 100/waveguide structures 124 of PIC 100, the detrimental effects due to fluctuating targets and TOF limitations are mitigated, thus enabling a coherent LIDAR with high optical resolution, high data rate, and long-range detection to be achieved. The light source 202 is described in more detail below.

The light detection and ranging system 200 may further include a grating structure 206 optically arranged to guide light from the output 114 of the plurality of waveguide structures 124/of the PIC 100 to the outside of the light detection and ranging system 200 and from the outside of the light detection and ranging system 200 to the plurality of optical photo detectors 112. By using a multiple (M) wavelength laser source 202 and a diffraction grating as grating structure 206, the number of LIDAR channels may be increased by a factor of M for a given PIC 100 to achieve a desired high number (>100) of vertical resolution elements or pixels. Hence, a high-performance coherent LIDAR system 200 is achieved.

Electromagnetic radiation, e.g. visible light, infrared radiation, terahertz radiation or microwave radiation, may be emitted to different parts of a target 210, e.g. at the same time, by the grating structure 206 and/or a lense structure 204, as described in more detail below. This way, light 116 emitted by the output 114 of the PIC 100 samples different portions of a target (not the same pixel) and/or different targets at the same time. Thus, light reflected 122 from the target 210 and detected by the photo detectors 122 of different light paths 140-1/2/N contains information correlated to different portions of a target (not the same pixel) and/or different targets at the same time. In other words, light form plurality of light paths 140-N is emitted into different directions in space by the grating 206. Light 122 is back reflected from the target 210 and received from the target 210 in the same light path from which it has been emitted before. This way, a mapping between the emitted light 116 and the information of the target 210 is enabled. As example, a sampling rate of the light detection and ranging system 200 and, thus, a resolution, may be increased while at least maintaining or decreasing noise effects.

In other words, the light detection and ranging system 200 may include a photonic integrated circuit 100 having a semiconductor photonic substrate 102 having integrated therein at least one light receiving input 104; at least one optical splitter 110 to branch light received at the at least one light receiving input 104 to a plurality of light paths 140-N and a plurality of light paths 140-N. In each light path of the plurality of light paths 140-N, the photonic integrated circuit 100 may include at least one amplifier structure 108 to amplify the light 118 in the light path to provide an amplified light 116; at least one light output 114 to output the amplified light 116 from the photonic integrated circuit 100 and at least one photo detector 112 to detect and/or receive light 122 from the outside of the photonic integrated circuit 100. Light 122 received from the outside of the photonic integrated circuit 100 may be passed through the output 114 to the photo detector 112. The at least one photo detector 112 may be located next to the at least one light output 114, e.g. on the same substrate, formed from the same substrate or integrated in the same substrate. In each light path of the plurality of light paths 140-N, the photonic integrated circuit 100 may be configured to output light from the light path to the outside of the photonic integrated circuit 100 and each of the optical photo detectors 112 may be configured to detect and/or receive light 122 from the outside of the photonic integrated circuit 100. The light detection and ranging system 200 may further include a grating structure 206 optically arranged to guide light from the output of the plurality of waveguide structures 124 to the outside of the light detection and ranging system 200 and from the outside of the light detection and ranging system 200 to the plurality of optical photo detectors 112.

In various aspects, at least one light receiving input 104 may be optically coupled to the plurality of waveguide structures 124 of the plurality of light paths 140-N. At least one light source 202 may be coupled to the at least one light receiving input 104. The at least one light source 202 may be configured to provide coherent electromagnetic radiation 120 to the plurality of waveguide structures 124, e.g. laser radiation in a visible light spectrum, an infrared spectrum, a terahertz spectrum and/or a microwave spectrum. The light source 202 may be configured to be operated as a continuous wave (CCW) laser, e.g. for frequency modulated continuous wave (FMCCW) LIDAR in which the frequency of the light 116 input to the input 104 is swept or chirped, and/or a pulsed laser, e.g. for TOF LIDAR. However, the light source 202 may also be a CW laser, e.g. a CW laser diode, operated in a pulsed mode, e.g. quasi CW (QCW) laser.

In various aspects, the PIC may include a controller 212 configured to control various electronic components. The controller 212 may be an application specific integrated circuit (ASIC), as example. The controller 212 may be formed from, integrated in or mounted to the semiconductor photonic substrate 102. However, the controller 212 may also be located outside of the PIC 100 in various aspects.

In various aspects, the controller 212 of the light detection and ranging system 200 (see FIG. 1 as example) may be configured to control a light source 202 to emit a first electromagnetic radiation (also denoted as light of a first wavelength or wavelength band) through a first light path 140-1 of the photonic integrated circuit 100 to the outside of the light detection and ranging system 200 and a second electromagnetic radiation (also denoted as light of a first wavelength or wavelength band) through a second light path 140-2 of the photonic integrated circuit 100 to the outside of the light detection and ranging system 200. The controller 212 may further be configured such that a first photo detector 112 detects a first received electromagnetic radiation 122 received through the first light path 140-1 of the photonic integrated circuit 100 from the outside of the light detection and ranging system 200 and a second photo detector 112 detects a second electromagnetic radiation 122 through the second light path 140-2 of the photonic integrated circuit 100 from the outside of the light detection and ranging system 200.

The controller 212 may further be configured to determine a frequency difference between the frequency of the first electromagnetic radiation 116 and the first received electromagnetic radiation 122 and to determine a frequency difference between the frequency of the second electromagnetic radiation 116 and the second received electromagnetic radiation 122.

The controller 212 may further be configured to determine a time difference between the emission timing of the first electromagnetic radiation 116 and the detection timing of the first received electromagnetic radiation 122 and determine a time difference between emission timing of the second electromagnetic radiation 116 and the detection timing of the received electromagnetic radiation 122.

The controller 212 may further be configured to control the light source 202 such that the light source 202 emits the first electromagnetic radiation and the second electromagnetic radiation at the same time. The first electromagnetic radiation and the second electromagnetic radiation may have the same frequency. Alternatively, the first electromagnetic radiation may have a first frequency and the second electromagnetic radiation may have a second frequency different from the first frequency.

The controller 212 may further be configured to control the light source 202 such that the light source 202 emits a third electromagnetic radiation through the first light path 140-1 of the photonic integrated circuit 100 to the outside of the light detection and ranging system 200 and/or emits a fourth electromagnetic radiation through the second light path 140-2 of the photonic integrated circuit 100 to the outside of the light detection and ranging system 200; and to control the first photo detector 112 to detect a third received electromagnetic radiation received through the first light path 140-1 of the photonic integrated circuit 100 from the outside of the light detection and ranging system 200 and to control the second photo detector 112 to detect a fourth electromagnetic radiation received through the second light path 140-2 of the photonic integrated circuit 100 from the outside of the light detection and ranging system 200; wherein the first and third electromagnetic radiation may be different from one another and/or the second and fourth electromagnetic radiation may be different from one another.

Figure 3:
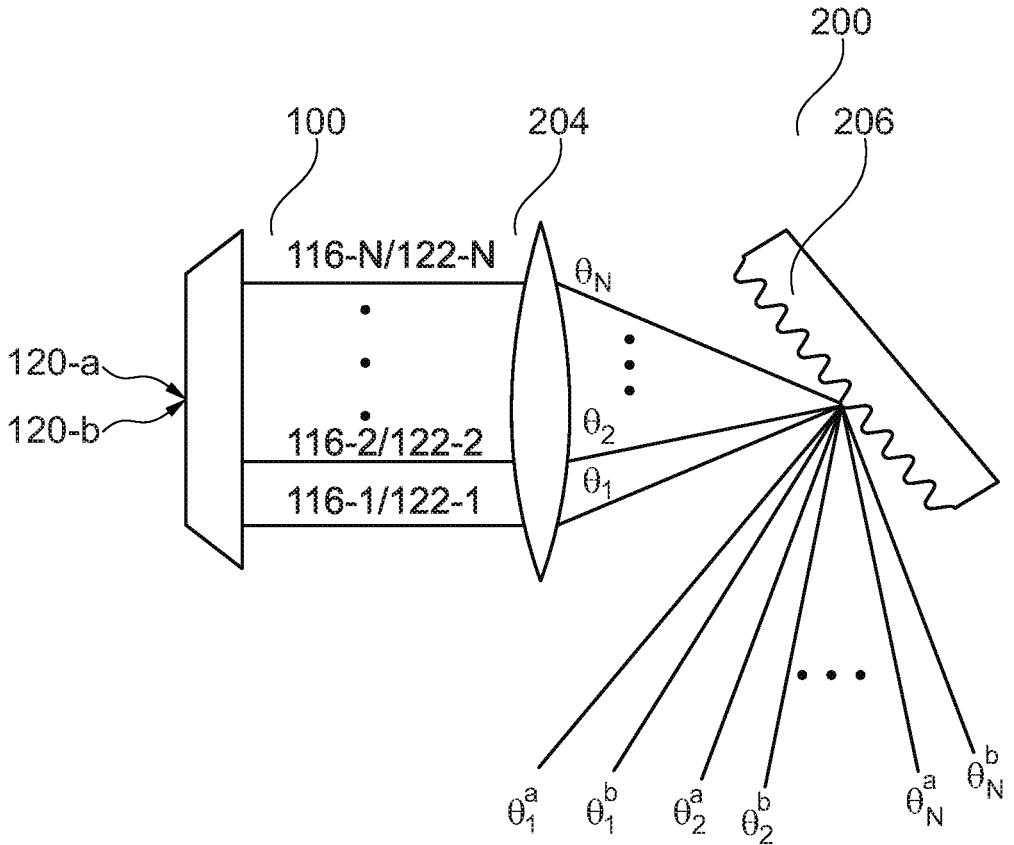
FIG. 3 illustrates a light detection and ranging system according to various aspects.

FIG. 3 illustrates a schematic diagram of a light detection and ranging system 200 according to various aspects during operation. In various aspects, the at least one light source 202 may be configured to emit electromagnetic radiation 120 of at least a first wavelength band 120-a (also denoted as first wavelength) and to emit electromagnetic radiation 120 of at least a second wavelength band 120-b (also denoted as second wavelength). The first wavelength band 120-a may be different from the second wavelength band 120-b. As example, the first wavelength band 120-a and the second wavelength band 120-b may not be overlapping.

In various aspects, the at least one light source 202 may include at least a first laser diode configured to emit electromagnetic radiation 120 of a first wavelength band 120-a and a second laser diode configured to emit electromagnetic radiation 120 of a second wavelength band 120-b. Alternatively or in addition, the at least one light source 202 may be a single light diode, e.g. a laser diode having a tunable spectrum and/or emit light in different wavelength bands, e.g. to emit electromagnetic radiation 120 of the first and second wavelength band 120-a, 120-b.

The light detection and ranging system 200 may further include a converging lense 204 arranged in the light path between the grating structure 206 and the photonic integrated circuit 100. The converging lense 204 may be configured to guide light of the plurality of light paths 140-N of the photonic integrated circuit 100 into different directions ($\theta_1$, $\theta_2$, $\theta_N$) outside of the light detection and ranging system 200 by the grating structure 206. In other words, the converging lense 204 may be configured and/or may be provided such that light from the outputs 114 of the first and second light paths 140-1/140-2 and/or the plurality of light paths 140-N have different angles of inclination on a (planar) grating structure 206. However, the function of the converging lense 204 and of the grating structure 206 may also be integrated in a single optical element in various aspects. The purpose of both elements 204, 206 may be to emit parallel light from the outputs 114 of the light paths into different directions in space at the same time and receive and detect the light 122 back reflected from a target 210 in the photo detector of the same light path from which the light 116 has been emitted before. The grating structure 206 may be configured to guide or redirect electromagnetic radiation of a first wavelength 120-a by a first angle (ea in FIG. 3) and a second wavelength 120-b by a second angle ($\theta^b$ in FIG. 3). Thus, emitted light 116-1/2/N or received light 122-1/2/N of the first, second or N-th light path 140-1/2/N (see FIG. 1) may be emitted and received from different directions in space (in FIG. 3 denoted by $\theta_{1/2/N}^{a/b}$) depending on the wavelength (frequency) of the light 120-a/120b. As example, the light 116-1, 122-1 having a first wavelength 120-a of a first light path (140-1) may be guided, e.g. diffracted, by an angle of $\theta_1^a$ from the grating structure 206 onto a target in the free space and the light 116-N, 122-N having a first wavelength 120-a of a N-th light path (140-N) may be guided, e.g. diffracted, by an angle of $\theta_N^a$ from the grating structure 206 onto the target in the free space. Here, $\theta_1^a$ and $\theta_N^a$ may be different.

In FIG. 3, the light detection and ranging system 200 is illustrated in a linear fashion with the lense 204 illustrated as converging lense 204 and the grating structure 206 as a refraction grating. However, the PIC or at least the outputs 114 of the PIC, the lense 204 and the grating structure 206 may be arranged vertically over each other as layers in a stack. As example, the grating structure 206 may be configured as a diffraction grating.

In various aspects, light of the first wavelength 120-a and light of the second wavelength 120-b may be emitted at the same time, e.g. the light paths may be multiplexed, or successively. As example, light of the second wavelength 120-b maybe emitted in the time period while awaiting light of the first wavelength 122-1 to be received at the photo detector.

In various aspects, using light (of the same wavelength) emitted by a plurality of light paths 140-N into different directions in space $\theta_{1/2/N}$ and/or using light of different wavelength that is emitted into different directions in space $\theta^{a/b}$ may enable a scanning, sensing or sampling of different parts of a target or free space at the same time and, thus, allows to increase the resolution of the light detection and ranging system 200.

FIG. 4 illustrates a schematic diagram of a light detection and ranging system 200 according to various aspects. The light detection and ranging system 200 having a PIC 100 may be formed according to an above described aspect. The light detection and ranging system 200 may further include a scan mirror 404 in the light path between the grating structure 206 and the outside of the light detection and ranging system 200. The light detection and ranging may further include a quarter wave plate 402 in the light path between the grating structure 206 and the scan mirror 404 and/or the outside of the light detection and ranging system 200.

As further illustrated in FIG. 4, the light detection and ranging system 200 may include a plurality of light sources (also denoted as (coherent) electromagnetic radiation source) each configured to emit electromagnetic radiation having a wavelength/frequency different to the wavelength/frequency of the other light sources. Alternatively or in addition, the light detection and ranging system 200 may include one or more light source(s) configured to emit electromagnetic radiation of different/multiple wavelengths/frequencies. A wavelength/frequency of a plurality of wavelengths/frequencies of a single light source may be selected by an optical filter, e.g. a low pass, high pass, band pass or notch filter.

Further illustrated in FIG. 4 is the branching of light paths from the at least one input 104 to the plurality of outputs 114. The branching may be realized by a plurality of optical amplifiers, e.g. SOA, a plurality of optical splitters and a plurality of waveguide structures (solid lines in FIG. 4).

Further illustrated in FIG. 4 is a use of balanced photo detector pairs as photo detectors 112 in the light paths respectively.

Further illustrated in FIG. 4 is a use of a part of the light emitted through the output 114 as input signal for a photo detector 112 in the light paths respectively. Here, the input signal may be used as local oscillator (LO) for determining a difference between the emitted light and received light. This way, temporal fluctuations of the emitted light may be considered in the received light for each light path individually.

FIG. 5 illustrates a flow diagram of a method 500 to operate a light detection and ranging system 200 according to various aspects. The method 500 may include: emit 502 a first electromagnetic radiation through a first light path 140-1 of the photonic integrated circuit 100 to the outside of the light detection and ranging system 200 and emit 504 a second electromagnetic radiation through a second light path 140-2 of the photonic integrated circuit 100 to the outside of the light detection and ranging system 200; and detect 506, by a first photo detector 112, a first received electromagnetic radiation received through the first light path 140-1 of the photonic integrated circuit 100 from the outside of the light detection and ranging system 200 and detect 508, by a second photo detector 112, a second electromagnetic radiation through the second light path 140-2 of the photonic integrated circuit 100 from the outside of the light detection and ranging system 200.

The method 500 may include to determine a frequency difference between the frequency of the first electromagnetic radiation and the first received electromagnetic radiation and determine a frequency difference between the frequency of the second electromagnetic radiation and the second received electromagnetic radiation.

The method 500 may include to determine a time difference between the emission timing of the first electromagnetic radiation and the detection timing of the first received electromagnetic radiation and determine a time difference between emission timing of the second electromagnetic radiation and the detection timing of the received electromagnetic radiation.

The method 500 may include to emit the first electromagnetic radiation and the second electromagnetic radiation at the same time.

The first electromagnetic radiation and the second electromagnetic radiation have the same frequency.

The first electromagnetic radiation may have a first frequency and the second electromagnetic radiation may have a second frequency different from the first frequency.

The method 500 may include to emit a third electromagnetic radiation through the first light path 140-1 of the photonic integrated circuit 100 to the outside of the light detection and ranging system 200 and/or a fourth electromagnetic radiation through the second light path 140-2 of the photonic integrated circuit 100 to the outside of the light detection and ranging system 200; and to detect, by the first photo detector 112, a third received electromagnetic radiation received through the first light path 140-1 of the photonic integrated circuit 100 from the outside of the light detection and ranging system 200 and detect, by the second photo detector 112, a fourth electromagnetic radiation through the second light path 140-2 of the photonic integrated circuit 100 from the outside of the light detection and ranging system 200; wherein the first and third electromagnetic radiation and/or the second and fourth electromagnetic radiation may be different from one another.

Figure 6:
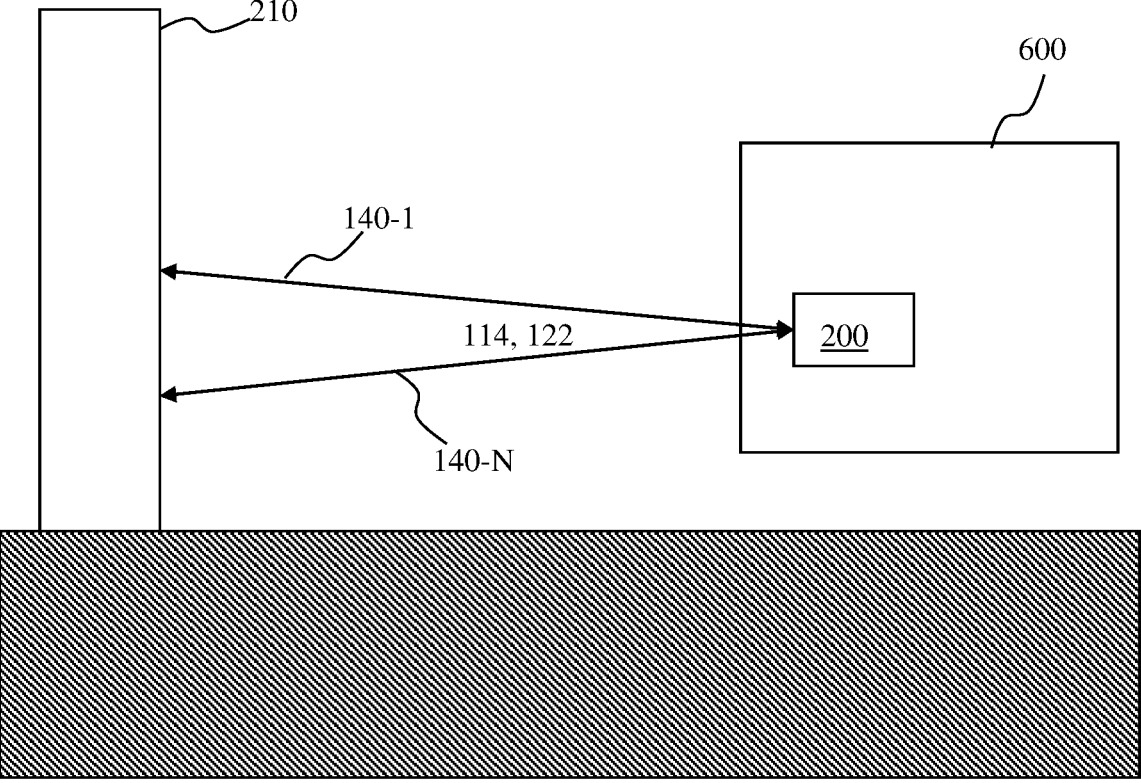
FIG. 6 illustrates a schematic diagram of a vehicle having a light detection and ranging system integrated therein according to various aspects.

FIG. 6 illustrates a schematic diagram of a vehicle 600 having a light detection and ranging system (LIDAR) 200 integrated therein according to various aspects. The vehicle 600 may be an unmanned vehicle, e.g. unmanned aerial vehicle or unmanned automobile. The vehicle 600 may be an autonomous vehicle. Here, the LI DAR system 200 may be used to control the direction of travel of the vehicle. Alternatively or in addition, the vehicle may require a driver to control the direction of travel of the vehicle 600. Here, the LI DAR system 200 may be a driving assistant. As example, the LI DAR system 200 may be configured for obstacle detection, e.g. determining a distance and/or direction and relative velocity of an obstacle (target 210) outside of the vehicle 600.

For one or more aspects, at least one of the components set forth in one or more of the preceding FIGS. may be configured to perform one or more operations, techniques, processes, and/or methods as set forth in the example section below. For example, the baseband circuitry as described above in connection with one or more of the preceding FIGS. may be configured to operate in accordance with one or more of the examples set forth below. For another example, circuitry associated with a UE, base station, network element, etc. as described above in connection with one or more of the preceding FIGS. may be configured to operate in accordance with one or more of the examples set forth below in the example section.

EXAMPLES

The examples set forth herein are illustrative and not exhaustive.

Example 1 is a photonic integrated circuit, including a semiconductor photonic substrate having integrated therein at least one light receiving input; at least one optical splitter to branch light received at the at least one light receiving input to a first light path and a second light path; wherein the photonic integrated circuit, in the first light path, includes: at least one first amplifier structure to amplify the light in the first light path to provide first amplified light; at least one first light output to output the first amplified light from the at least one first amplifier structure; and at least one first photo detector to receive light from the outside of the photonic integrated circuit, the at least one first photo detector being located next to the at least one first light output; wherein the photonic integrated circuit, in the second light path, includes: at least one second amplifier structure to amplify the light in the second light path to provide second amplified light; at least one second light output to output the second amplified light from the at least one second amplifier structure; and at least one second photo detector to receive light from the outside of the photonic integrated circuit, the at least one second photo detector being located next to the at least one second light output.

In Example 2, the subject matter of Example 1 can optionally include that the semiconductor photonic substrate is made of a semiconductor material.

In Example 3, the subject matter of Example 1 or 2 can optionally include that the semiconductor photonic substrate is made of silicon.

In Example 4, the subject matter of any one of Examples 1 to 3 can optionally include that the at least one first light output and the at least one first photo detector are arranged on the same side of the photonic integrated circuit; and/or can optionally include that the at least one second light output and the at least one second photo detector are arranged on the same side of the photonic integrated circuit.

In Example 5, the subject matter of any one of Examples 1 to 4 can optionally include that the at least one first photo detector includes a first photo diode; and/or can optionally include that the at least one second photo detector includes a second photo diode.

In Example 6, the subject matter of any one of Examples 1 to 5, can optionally include that the photonic integrated circuit, in the first light path, includes at least one first waveguide structure; and/or can optionally include that the photonic integrated circuit, in the second light path, includes at least one second waveguide structure.

In Example 7, the subject matter of any one of Examples 1 to 6 can optionally include that the photonic integrated circuit, in the first light path, includes at least one optical splitter to branch light received from the at least one light receiving input to the at least one first photo detector and to the first light output; and/or can optionally include that the photonic integrated circuit, in the second light path, includes at least one optical splitter to branch light received from the at least one light receiving input to the at least one second photo detector and to the second light output.

In Example 8, the subject matter of any one of Examples 1 to 7 can optionally include that the photonic integrated circuit, in the first light path, includes at least one first waveguide structure and the photonic integrated circuit, in the second light path, includes at least one second waveguide structure that is optically isolated.

In Example 9, the subject matter of Example 8 can optionally include that the first waveguide structure and the second waveguide structure are optically isolated from each other.

In Example 10, the subject matter of any one of Examples 8 or 9 can optionally include that the at least one first waveguide structure is formed from semiconductor photonic substrate; and/or can optionally include that the at least one second waveguide structure is formed from semiconductor photonic substrate.

In Example 11, the subject matter of any one of Examples 1 to 10 can optionally include that the light receiving input includes an optical coupler configured for optical interconnect an electromagnetic radiation source outside of the semiconductor photonic substrate to the at least one optical splitter.

In Example 12, the subject matter of any one of Examples 1 to 11 can optionally include that the at least one first photo detector of the first light path and/or the at least one second photo detector of the second light path are/is an individual photo detector.

In Example 13, the subject matter of any one of Examples 1 to 12 can optionally include that the photonic integrated circuit, in the first light path, includes at least one balanced photo detector pair; and/or can optionally include that the photonic integrated circuit, in the second light path, includes at least one balanced photo detector pair.

In Example 14, the subject matter of any one of Examples 1 to 13 can optionally include that the first amplifier structure includes a semiconductor optical amplifier and/or can optionally include that the second amplifier structure includes a semiconductor optical amplifier.

In Example 15, the subject matter of any one of Examples 1 to 14 can optionally include a plurality of waveguide structures on a common semiconductor photonic substrate, and a plurality of photo detectors on the same semiconductor photonic substrate, wherein each waveguide structure of the plurality of waveguide structures is coupled to at least one photo detector of the plurality of photo detectors, such that photo detectors coupled to different waveguide structures are addressable independently from each other.

In Example 16, the subject matter of any one of Examples 1 to 15 can optionally include that the at least one optical splitter is configured to branch light received at the at least one light receiving input to a plurality of light paths, wherein each light path of the plurality of light paths includes at least one amplifier structure to amplify the light in the light path to provide an amplified light; at least one light output to output the amplified light from the photonic integrated circuit; and at least one photo detector to receive light from the outside of the photonic integrated circuit, the at least one photo detector being located next to the at least one light output.

In Example 17, the subject matter of any one of Examples 1 to 16 can optionally include that the photo detectors of the plurality of light paths are individual photo detectors.

In Example 18, the subject matter of any one of Examples 1 to 17 can optionally include at least one electromagnetic radiation source coupled to the at least one light receiving input and configured to emit an electromagnetic radiation of a frequency or a frequency band.

In Example 19, the subject matter of any one of Examples 1 to 17 can optionally include that the electromagnetic radiation source is configured to emit at least one coherent electromagnetic radiation.

In Example 20, the subject matter of any one of Examples 18 or 19 can optionally include that the electromagnetic radiation source is formed or integrated in the semiconductor photonic substrate.

In Example 21, the subject matter of any one of Examples 18 or 19 can optionally include that the electromagnetic radiation source is external to the semiconductor photonic substrate.

In Example 22, the subject matter of any one of Examples 18 to 21 can optionally include at least another electromagnetic radiation source coupled to the at least one light receiving input and configured to emit another electromagnetic radiation of another frequency or another frequency band.

In Example 23, the subject matter of any one of Examples 18 to 22 can optionally include that the electromagnetic radiation source is configured to emit electromagnetic radiation of at least a first frequency or first frequency band and a second frequency or second frequency band.

In Example 24, the subject matter of Example 23 can optionally include that the first and second wavelengths or wavelength bands are not overlapping.

Example 25 is a light detection and ranging system, including a semiconductor photonic substrate having integrated therein: at least one light receiving input; at least one optical splitter to branch light received at the at least one light receiving input to a first light path and a second light path. The first light path includes: at least one first amplifier structure to amplify the light in the first light path to provide first amplified light; at least one first light output to output the first amplified light from the at least one first amplifier structure; and at least one first photo detector to receive light from the outside of the photonic integrated circuit, the at least one first photo detector being located next to the at least one first light output. The photonic integrated circuit, in the second light path, includes: at least one second amplifier structure to amplify the light in the second light path to provide second amplified light; at least one second light output to output the second amplified light from the at least one second amplifier structure; and at least one second photo detector to receive light from the outside of the photonic integrated circuit, the at least one second photo detector being located next to the at least one second light output. The light detection and ranging system further includes at least one electromagnetic radiation source coupled to the at least one light receiving input and configured to emit an electromagnetic radiation; and a grating structure optically arranged to guide light from the output of the plurality of the light paths to the outside of the light detection and ranging system and from the outside of the light detection and ranging system to the plurality of optical photo detectors.

In Example 26, the subject matter of Example 25 can optionally include that the electromagnetic radiation source is configured to be operated as a continuous wave laser and/or a pulsed laser.

In Example 27, the subject matter of Example 25 or 26 can optionally include that the at least one electromagnetic radiation source is configured to emit electromagnetic radiation of at least a first wavelength band and a second wavelength band different from the first wavelength band.

In Example 28, the subject matter of any one of Examples 25 to 27 can optionally include that the at least one electromagnetic radiation source includes at least a first laser diode configured to emit electromagnetic radiation of a first wavelength band and a second laser diode configured to emit electromagnetic radiation of a second wavelength band.

In Example 29, the subject matter of any one of Examples 25 to 28 can optionally include that the electromagnetic radiation source is formed or integrated in the semiconductor photonic substrate.

In Example 30, the subject matter of any one of Examples 25 to 28 can optionally include that the electromagnetic radiation source is external to the semiconductor photonic substrate.

In Example 31, the subject matter of any one of Examples 25 to 30 can optionally further include at least another electromagnetic radiation source coupled to the at least one light receiving input and configured to emit another electromagnetic radiation of another frequency or another frequency band.

In Example 32, the subject matter of any one of Examples 25 to 31 can optionally further include that the electromagnetic radiation source is configured to emit electromagnetic radiation of at least a first frequency or first frequency band and a second frequency or second frequency band.

In Example 33, the subject matter of Example 32 can optionally include that the first and second wavelengths or wavelength bands are not overlapping.

In Example 34, the subject matter of any one of Examples 25 to 33 can optionally include that the grating structure is a diffraction grating or a refraction grating.

In Example 35, the subject matter of any one of Examples 25 to 34 can optionally further include a converging lense arranged in the first and second light path between the grating structure and the photonic integrated circuit.

In Example 36, the subject matter of Example 35 can optionally include that the converging lense is configured to guide light of the first and second light paths of the photonic integrated circuit into different directions outside of the light detection and ranging system by the grating structure In Example 37, the subject matter of any one of Examples 25 to 36 can optionally include that the semiconductor photonic substrate is made of a semiconductor material.

In Example 38, the subject matter of any one of Examples 25 to 37 can optionally include that the semiconductor photonic substrate is made of silicon.

In Example 39, the subject matter of any one of Examples 25 to 38 can optionally include that the at least one first light output and the at least one first photo detector are arranged on the same side of the photonic integrated circuit; and/or can optionally include that the at least one second light output and the at least one second photo detector are arranged on the same side of the photonic integrated circuit.

In Example 40, the subject matter of any one of Examples 25 to 39 can optionally include that the at least one first photo detector includes a first photo diode; and/or the at least one second photo detector includes a second photo diode.

In Example 41, the subject matter of any one of Examples 25 to 40, can optionally include that the photonic integrated circuit, in the first light path, includes at least one first waveguide structure; and/or the photonic integrated circuit, in the second light path, includes at least one second waveguide structure.

In Example 42, the subject matter of any one of Examples 25 to 41 can optionally include that the photonic integrated circuit, in the first light path, includes at least one optical splitter to branch light received from the at least one light receiving input to the at least one first photo detector and to the first light output; and/or that the photonic integrated circuit, in the second light path, includes at least one optical splitter to branch light received from the at least one light receiving input to the at least one second photo detector and to the second light output.

In Example 43, the subject matter of any one of Examples 25 to 42 can optionally include that the photonic integrated circuit, in the first light path, includes at least one first waveguide structure and the photonic integrated circuit, in the second light path, includes at least one second waveguide structure that is optically isolated.

In Example 44, the subject matter of Example 43 can optionally include that the first waveguide structure and the second waveguide structure are optically isolated from each other.

In Example 45, the subject matter of any one of Examples 25 to 44 can optionally include that the at least one first waveguide structure is formed from the semiconductor photonic substrate; and/or that the at least one second waveguide structure is formed from the semiconductor photonic substrate.

In Example 46, the subject matter of any one of Examples 25 to 45 can optionally include that the light receiving input includes an optical coupler configured for optical interconnect an electromagnetic radiation source outside of the semiconductor photonic substrate to the at least one optical splitter.

In Example 47, the subject matter of any one of Examples 25 to 46 can optionally include that the at least one first photo detector of the first light path and/or the at least one second photo detector of the second light path are/is an individual photo detector.

In Example 48, the subject matter of any one of Examples 25 to 47 can optionally include that the photonic integrated circuit, in the first light path, includes at least one balanced photo detector pair; and/or that the photonic integrated circuit, in the second light path, includes at least one balanced photo detector pair.

In Example 49, the subject matter of any one of Examples 25 to 48 can optionally include that the first amplifier structure includes a semiconductor optical amplifier and/or that the second amplifier structure includes a semiconductor optical amplifier.

In Example 50, the subject matter of any one of Examples 25 to 49 can optionally include that the photo detectors of the first and second light paths are individual photo detectors.

In Example 51, the subject matter of any one of Examples 25 to 50 can optionally further include a scan mirror in the light path between the grating structure and the outside of the light detection and ranging system.

In Example 52, the subject matter of any one of Examples 25 to 51 can optionally further include a quarter wave plate in the light path between the grating structure and the scan mirror.

In Example 53, the subject matter of any one of Examples 25 to 52 can optionally further include a controller configured to control the electromagnetic radiation source to: emit a first electromagnetic radiation through a first light path of the photonic integrated circuit to the outside of the light detection and ranging system and a second electromagnetic radiation through a second light path of the photonic integrated circuit to the outside of the light detection and ranging system; and to control a first photo detector to detect a first received electromagnetic radiation received through the first light path of the photonic integrated circuit from the outside of the light detection and ranging system and to control a second photo detector to detect a second electromagnetic radiation through the second light path of the photonic integrated circuit from the outside of the light detection and ranging system.

In Example 54, the subject matter of Example 53, the controller can optionally further be configured determine a frequency difference between the frequency of the first electromagnetic radiation and the first received electromagnetic radiation and determine a frequency difference between the frequency of the second electromagnetic radiation and the second received electromagnetic radiation.

In Example 55, the subject matter of any one of Examples 53 or 54, the controller can optionally further be configured to determine a time difference between the emission timing of the first electromagnetic radiation and the detection timing of the first received electromagnetic radiation and determine a time difference between emission timing of the second electromagnetic radiation and the detection timing of the received electromagnetic radiation.

In Example 56, the subject matter of any one of Examples 53 to 55 can optionally further include that the controller is further configured to control the electromagnetic radiation source to emit the first electromagnetic radiation and the second electromagnetic radiation at the same time.

In Example 57, the subject matter of any one of Examples 53 to 56 can optionally include that the first electromagnetic radiation and the second electromagnetic radiation have the same frequency.

In Example 58, the subject matter of any one of Examples 53 to 56 can optionally include that the first electromagnetic radiation has a first frequency and the second electromagnetic radiation has a second frequency different from the first frequency.

In Example 59, the subject matter of any one of Examples 25 to 58 can optionally include that the at least one electromagnetic radiation source is configured to emit a first electromagnetic radiation of at least a first frequency or first frequency band and: can optionally include that the at least one electromagnetic radiation source is further configured to emit a second electromagnetic radiation of a second frequency or second frequency band, or further including a second electromagnetic radiation source coupled to the at least one light receiving input and configured to emit a second electromagnetic radiation of a second frequency or second frequency band; further including a controller configured to control the electromagnetic radiation source(s) to emit the first electromagnetic radiation through the first and/or second light paths of the photonic integrated circuit to the outside of the light detection and ranging system and the second electromagnetic radiation through the first and/or second light paths of the photonic integrated circuit to the outside of the light detection and ranging system; and configured to control the first and/or second photo detectors to detect a first and/or second received electromagnetic radiation received through the first and second light path of the photonic integrated circuit from the outside of the light detection and ranging system.

In Example 60, the subject matter of any one of Examples 44 to 50 can optionally include that the light detection and ranging system is a LIDAR system.

Example 61 is a vehicle including a light detection and ranging (LIDAR) system. The light detection and ranging (LIDAR) system including a semiconductor photonic substrate having integrated therein: at least one light receiving input; at least one optical splitter to branch light received at the at least one light receiving input to a first light path and a second light path. The first light path includes: at least one first amplifier structure to amplify the light in the first light path to provide first amplified light; at least one first light output to output the first amplified light from the at least one first amplifier structure; and at least one first photo detector to receive light from the outside of the photonic integrated circuit, the at least one first photo detector being located next to the at least one first light output. The photonic integrated circuit, in the second light path, includes: at least one second amplifier structure to amplify the light in the second light path to provide second amplified light; at least one second light output to output the second amplified light from the at least one second amplifier structure; and at least one second photo detector to receive light from the outside of the photonic integrated circuit, the at least one second photo detector being located next to the at least one second light output. The light detection and ranging system further includes at least one electromagnetic radiation source coupled to the at least one light receiving input and configured to emit an electromagnetic radiation; and a grating structure optically arranged to guide light from the output of the plurality of the light paths to the outside of the light detection and ranging system and from the outside of the light detection and ranging system to the plurality of optical photo detectors.

In Example 62, the subject matter of Example 61 can optionally include that the vehicle is an unmanned vehicle.

In Example 63, the subject matter of Example 61 or 62 can optionally include that the vehicle is an unmanned aerial vehicle.

In Example 63, the subject matter of Example 61 or 62 can optionally include that the vehicle is an automobile.

In Example 64, the subject matter of any one of Examples 61 to 63 can optionally include that the vehicle is an autonomous vehicle.

In Example 65, the subject matter of any one of Examples 61 to 63 can optionally include that the LIDAR system is configured for obstacle detection outside of the vehicle.

In Example 66, the subject matter of any one of Examples 61 to 65 can optionally include that the electromagnetic radiation source is configured to be operated as a continuous wave laser and/or a pulsed laser.

In Example 67, the subject matter of Example 61 to 66 can optionally include that the at least one electromagnetic radiation source is configured to emit electromagnetic radiation of at least a first wavelength band and a second wavelength band different from the first wavelength band.

In Example 68, the subject matter of any one of Examples 61 to 67 can optionally include that the at least one electromagnetic radiation source includes at least a first laser diode configured to emit electromagnetic radiation of a first wavelength band and a second laser diode configured to emit electromagnetic radiation of a second wavelength band.

In Example 69, the subject matter of any one of Examples 61 to 68 can optionally include that the electromagnetic radiation source is formed or integrated in the semiconductor photonic substrate.

In Example 70, the subject matter of any one of Examples 61 to 68 can optionally include that the electromagnetic radiation source is external to the semiconductor photonic substrate.

In Example 71, the subject matter of any one of Examples 61 to 70, further including at least another electromagnetic radiation source coupled to the at least one light receiving input and configured to emit another electromagnetic radiation of another frequency or another frequency band.

In Example 72, the subject matter of any one of Examples 61 to 71, further including can optionally include that the electromagnetic radiation source is configured to emit electromagnetic radiation of at least a first frequency or first frequency band and a second frequency or second frequency band.

In Example 73, the subject matter of Example 72 can optionally include that the first and second wavelengths or wavelength bands are not overlapping.

In Example 74, the subject matter of any one of Examples 61 to 73 can optionally include that the grating structure is a diffraction grating or a refraction grating.

In Example 75, the subject matter of any one of Examples 61 to 74 can optionally further include a converging lense arranged in the first and second light path between the grating structure and the photonic integrated circuit.

In Example 76, the subject matter of Example 75 can optionally include that the converging lense is configured to guide light of the first and second light paths of the photonic integrated circuit into different directions outside of the light detection and ranging system by the grating structure In Example 77, the subject matter of any one of Examples 61 to 76 can optionally include that the semiconductor photonic substrate is made of a semiconductor material.

In Example 78, the subject matter of any one of Examples 61 to 77 can optionally include that the semiconductor photonic substrate is made of silicon.

In Example 79, the subject matter of Examples 61 to 78 can optionally include that the at least one first light output and the at least one first photo detector are arranged on the same side of the photonic integrated circuit; and/or can optionally include that the at least one second light output and the at least one second photo detector are arranged on the same side of the photonic integrated circuit.

In Example 80, the subject matter of any one of Examples 61 to 79 can optionally include that the at least one first photo detector includes a first photo diode; and/or that the at least one second photo detector includes a second photo diode.

In Example 81, the subject matter of any one of Examples 61 to 80 can optionally include that the photonic integrated circuit, in the first light path, includes at least one first waveguide structure; and/or that the photonic integrated circuit, in the second light path, includes at least one second waveguide structure.

In Example 82, the subject matter of any one of Examples 61 to 81 can optionally include that the photonic integrated circuit, in the first light path, includes at least one optical splitter to branch light received from the at least one light receiving input to the at least one first photo detector and to the first light output; and/or that the photonic integrated circuit, in the second light path, includes at least one optical splitter to branch light received from the at least one light receiving input to the at least one second photo detector and to the second light output.

In Example 83, the subject matter of any one of Examples 61 to 82 can optionally include that the photonic integrated circuit, in the first light path, includes at least one first waveguide structure and the photonic integrated circuit, in the second light path, includes at least one second waveguide structure that is optically isolated.

In Example 84, the subject matter of Example 83 can optionally include that the first waveguide structure and the second waveguide structure are optically isolated from each other.

In Example 85, the subject matter of any one of Examples 61 to 84 can optionally include that the at least one first waveguide structure is formed from the semiconductor photonic substrate; and/or that the at least one second waveguide structure is formed from the semiconductor photonic substrate.

In Example 86, the subject matter of any one of Examples 61 to 85 can optionally include that the light receiving input includes an optical coupler configured for optical interconnect an electromagnetic radiation source outside of the semiconductor photonic substrate to the at least one optical splitter.

87, the subject matter of any one of Examples 61 to 86 can optionally include that the at least one first photo detector of the first light path and/or the at least one second photo detector of the second light path are/is an individual photo detector.

In Example 88, the subject matter of any one of Examples 61 to 87 can optionally include that the photonic integrated circuit, in the first light path, includes at least one balanced photo detector pair; and/or that the photonic integrated circuit, in the second light path, includes at least one balanced photo detector pair.

In Example 89, the subject matter of any one of Examples 61 to 88 can optionally include that the first amplifier structure includes a semiconductor optical amplifier and/or that the second amplifier structure includes a semiconductor optical amplifier.

In Example 90, the subject matter of any one of Examples 61 to 89 can optionally include that the photo detectors of the first and second light paths are individual photo detectors.

In Example 91, the subject matter of any one of Examples 61 to 90 can optionally further include a scan mirror in the light path between the grating structure and the outside of the light detection and ranging system.

In Example 92, the subject matter of any one of Examples 61 to 91 can optionally further include a quarter wave plate in the light path between the grating structure and the scan mirror.

In Example 93, the subject matter of any one of Examples 61 to 92, further including a controller configured to control the electromagnetic radiation source to: emit a first electromagnetic radiation through a first light path of the photonic integrated circuit to the outside of the light detection and ranging system and a second electromagnetic radiation through a second light path of the photonic integrated circuit to the outside of the light detection and ranging system; and to control a first photo detector to detect a first received electromagnetic radiation received through the first light path of the photonic integrated circuit from the outside of the light detection and ranging system and to control a second photo detector to detect a second electromagnetic radiation through the second light path of the photonic integrated circuit from the outside of the light detection and ranging system.

In Example 94, the subject matter of Example 93 can optionally include that the controller is further configured to determine a frequency difference between the frequency of the first electromagnetic radiation and the first received electromagnetic radiation and determine a frequency difference between the frequency of the second electromagnetic radiation and the second received electromagnetic radiation.

In Example 95, the subject matter of any one of Examples 93 or 94 can optionally include that the controller is further configured to determine a time difference between the emission timing of the first electromagnetic radiation and the detection timing of the first received electromagnetic radiation and determine a time difference between emission timing of the second electromagnetic radiation and the detection timing of the received electromagnetic radiation.

In Example 96, the subject matter of any one of Examples 93 to 95 can optionally include that the controller is further configured to control the electromagnetic radiation source to emit the first electromagnetic radiation and the second electromagnetic radiation at the same time.

In Example 97, the subject matter of any one of Examples 93 to 96 can optionally include that the first electromagnetic radiation and the second electromagnetic radiation have the same frequency.

In Example 98, the subject matter of any one of Examples 93 to 96 can optionally include that the first electromagnetic radiation has a first frequency and the second electromagnetic radiation has a second frequency different from the first frequency.

In Example 99, the subject matter of any one of Examples 61 to 98 can optionally include that the at least one electromagnetic radiation source is configured to emit a first electromagnetic radiation of at least a first frequency or first frequency band and: can optionally include that the at least one electromagnetic radiation source is further configured to emit a second electromagnetic radiation of a second frequency or second frequency band, or further including a second electromagnetic radiation source coupled to the at least one light receiving input and configured to emit a second electromagnetic radiation of a second frequency or second frequency band; further including a controller configured to control the electromagnetic radiation source(s) to: emit the first electromagnetic radiation through the first and/or second light paths of the photonic integrated circuit to the outside of the light detection and ranging system and the second electromagnetic radiation through the first and/or second light paths of the photonic integrated circuit to the outside of the light detection and ranging system; and configured to control the first and/or second photo detectors to detect a first and/or second received electromagnetic radiation received through the first and second light path of the photonic integrated circuit from the outside of the light detection and ranging system.

Example 100 is a method to operate a light detection and ranging system. The light detection and ranging system including a semiconductor photonic substrate having integrated therein: at least one light receiving input; at least one optical splitter to branch light received at the at least one light receiving input to a first light path and a second light path. The first light path includes: at least one first amplifier structure to amplify the light in the first light path to provide first amplified light; at least one first light output to output the first amplified light from the at least one first amplifier structure; and at least one first photo detector to receive light from the outside of the photonic integrated circuit, the at least one first photo detector being located next to the at least one first light output. The photonic integrated circuit, in the second light path, includes: at least one second amplifier structure to amplify the light in the second light path to provide second amplified light; at least one second light output to output the second amplified light from the at least one second amplifier structure; and at least one second photo detector to receive light from the outside of the photonic integrated circuit, the at least one second photo detector being located next to the at least one second light output. The light detection and ranging system further includes at least one electromagnetic radiation source coupled to the at least one light receiving input and configured to emit an electromagnetic radiation; and a grating structure optically arranged to guide light from the output of the plurality of the light paths to the outside of the light detection and ranging system and from the outside of the light detection and ranging system to the plurality of optical photo detectors. The method including emit a first electromagnetic radiation through a first light path of the photonic integrated circuit to the outside of the light detection and ranging system and a second electromagnetic radiation through a second light path of the photonic integrated circuit to the outside of the light detection and ranging system; and detect, by a first photo detector, a first received electromagnetic radiation received through the first light path of the photonic integrated circuit from the outside of the light detection and ranging system and detect, by a second photo detector, a second electromagnetic radiation through the second light path of the photonic integrated circuit from the outside of the light detection and ranging system.

In Example 101, the subject matter of Example 100 can optionally further include to determine a frequency difference between the frequency of the first electromagnetic radiation and the first received electromagnetic radiation and determine a frequency difference between the frequency of the second electromagnetic radiation and the second received electromagnetic radiation.

In Example 102, the subject matter of Example 100 can optionally further include determine a time difference between the emission timing of the first electromagnetic radiation and the detection timing of the first received electromagnetic radiation and determine a time difference between emission timing of the second electromagnetic radiation and the detection timing of the received electromagnetic radiation.

In Example 103, the subject matter of anyone of Examples 100 to 102 can optionally further include to emit the first electromagnetic radiation and the second electromagnetic radiation at the same time.

In Example 104, the subject matter of anyone of Examples 100 to 103 can optionally further include can optionally include that the first electromagnetic radiation and the second electromagnetic radiation have the same frequency.

In Example 105, the subject matter of anyone of Examples 100 to 104 can optionally further include can optionally include that the first electromagnetic radiation has a first frequency and the second electromagnetic radiation has a second frequency different from the first frequency.

In Example 106, the subject matter of anyone of Examples 100 to 105 can optionally further include to emit a third electromagnetic radiation through the first light path of the photonic integrated circuit to the outside of the light detection and ranging system and/or a fourth electromagnetic radiation through the second light path of the photonic integrated circuit to the outside of the light detection and ranging system; and detect, by the first photo detector, a third received electromagnetic radiation received through the first light path of the photonic integrated circuit from the outside of the light detection and ranging system and detect, by the second photo detector, a fourth electromagnetic radiation through the second light path of the photonic integrated circuit from the outside of the light detection and ranging system; wherein the first and third electromagnetic radiation and/or the second and fourth electromagnetic radiation are different from one another.

Any of the above-described examples may be combined with any other example (or combination of examples), unless explicitly stated otherwise. The foregoing description of one or more implementations provides illustration and description, but is not intended to be exhaustive or to limit the scope of aspects to the precise form disclosed. Modifications and variations are possible in light of the above teachings or may be acquired from practice of various aspects. Any of the above-described examples may be combined with any other example (or combination of examples), unless explicitly stated otherwise. The foregoing description of one or more implementations provides illustration and description, but is not intended to be exhaustive or to limit the scope of aspects to the precise form disclosed. Modifications and variations are possible in light of the above teachings or may be acquired from practice of various aspects.

While the invention has been particularly shown and described with reference to specific aspects, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced.

What is claimed is:

1. A photonic integrated circuit, comprising
a semiconductor photonic substrate having integrated therein:
at least one light receiving input;
at least one optical splitter to branch light received at the at least one light receiving input to a first light path and a second light path;

wherein the photonic integrated circuit, in the first light path, comprises:
at least one first amplifier structure to amplify the light in the first light path to provide first amplified light;
at least one first light output to output the first amplified light from the at least one first amplifier structure; and
at least one first photo detector to receive light from the outside of the photonic integrated circuit, the at least one first photo detector being located next to the at least one first light output;
wherein the photonic integrated circuit, in the second light path, comprises:
at least one second amplifier structure to amplify the light in the second light path to provide second amplified light;
at least one second light output to output the second amplified light from the at least one second amplifier structure; and
at least one second photo detector to receive light from the outside of the photonic integrated circuit, the at least one second photo detector being located next to the at least one second light output.

2. The photonic integrated circuit of claim 1, further comprising:
wherein the semiconductor photonic substrate is made of a semiconductor material.

3. The photonic integrated circuit of claim 1,
wherein the at least one first light output and the at least one first photo detector are arranged on the same side of the photonic integrated circuit; and/or
wherein the at least one second light output and the at least one second photo detector are arranged on the same side of the photonic integrated circuit.

4. The photonic integrated circuit of claim 1,
wherein, the photonic integrated circuit, in the first light path, comprises at least one first waveguide structure; and/or
wherein, the photonic integrated circuit, in the second light path, comprises at least one second waveguide structure.

5. The photonic integrated circuit of claim 1,
wherein the photonic integrated circuit in the first light path comprises at least one optical splitter to branch light received from the at least one light receiving input to the at least one first photo detector and to the first light output; and/or
wherein the photonic integrated circuit in the second light path comprises at least one optical splitter to branch light received from the at least one light receiving input to the at least one second photo detector and to the second light output.

6. The photonic integrated circuit of claim 1,
wherein the photonic integrated circuit in the first light path comprises at least one balanced photo detector pair; and/or
wherein the photonic integrated circuit in the second light path comprises at least one balanced photo detector pair.

7. The photonic integrated circuit of claim 1, comprising
a plurality of waveguide structures on a common semiconductor photonic substrate, and
a plurality of photo detectors on the same semiconductor photonic substrate, wherein each waveguide structure of the plurality of waveguide structures is coupled to at least one photo detector of the plurality of photo detectors, such that photo detectors coupled to different waveguide structures are addressable independently from each other.

8. The photonic integrated circuit of claim 1,
wherein the at least one optical splitter is configured to branch light received at the at least one light receiving input to a plurality of light paths, wherein each light path of the plurality of light paths comprises at least one amplifier structure to amplify the light in the light path to provide an amplified light; at least one light output to output the amplified light from the photonic integrated circuit; and at least one photo detector to receive light from the outside of the photonic integrated circuit, the at least one photo detector being located next to the at least one light output.

9. The photonic integrated circuit of claim 1, further comprising at least one electromagnetic radiation source coupled to the at least one light receiving input and configured to emit an electromagnetic radiation of a frequency or a frequency band.

10. The photonic integrated circuit of claim 9,
wherein the electromagnetic radiation source is configured to emit at least one coherent electromagnetic radiation.

11. The photonic integrated circuit of claim 9, further comprising at least another electromagnetic radiation source coupled to the at least one light receiving input and configured to emit another electromagnetic radiation of another frequency or another frequency band.

12. A light detection and ranging system, comprising
a semiconductor photonic substrate having integrated therein:
at least one light receiving input;
at least one optical splitter to branch light received at the at least one light receiving input to a first light path and a second light path;
wherein the first light path comprises:
at least one first amplifier structure to amplify the light in the first light path to provide first amplified light;
at least one first light output to output the first amplified light from the at least one first amplifier structure; and
at least one first photo detector to receive light from the outside of a photonic integrated circuit, the at least one first photo detector being located next to the at least one first light output;
wherein the second light path comprises:
at least one second amplifier structure to amplify the light in the second light path to provide second amplified light;
at least one second light output to output the second amplified light from the at least one second amplifier structure; and
at least one second photo detector to receive light from the outside of the photonic integrated circuit, the at least one second photo detector being located next to the at least one second light output;
at least one electromagnetic radiation source coupled to the at least one light receiving input and configured to emit an electromagnetic radiation; and
a grating structure optically arranged to guide light from the output of the plurality of the light paths to the outside of the light detection and ranging system and from the outside of the light detection and ranging system to a plurality of optical photo detectors.

13. The light detection and ranging system of claim 12,
wherein the electromagnetic radiation source is configured to be operated as a continuous wave laser and/or a pulsed laser.

14. The light detection and ranging system of claim 12,
wherein the at least one electromagnetic radiation source is configured to emit electromagnetic radiation of at least a first wavelength band and a second wavelength band different from the first wavelength band.

15. The light detection and ranging system of claim 12,
wherein the grating structure is a diffraction grating or a refraction grating.

16. The light detection and ranging system of claim 12,
further comprising: a converging lens arranged in the first and second light path between the grating structure and the photonic integrated circuit.

17. The light detection and ranging system of claim 12,
further comprising: a scan mirror in the light path between the grating structure and the outside of the light detection and ranging system.

18. The light detection and ranging system of claim 17,
further comprising:
a quarter wave plate in the light path between the grating structure and the scan mirror.

19. The light detection and ranging system of claim 12,
further comprising a controller configured to control the electromagnetic radiation source to:
emit a first electromagnetic radiation through the first light path of the photonic integrated circuit to the outside of the light detection and ranging system and a second electromagnetic radiation through the second light path of the photonic integrated circuit to the outside of the light detection and ranging system; and
to control a first photo detector to detect a first received electromagnetic radiation received through the first light path of the photonic integrated circuit from the outside of the light detection and ranging system and
to control a second photo detector to detect a second electromagnetic radiation through the second light path of the photonic integrated circuit from the outside of the light detection and ranging system.

20. The light detection and ranging system of claim 19,
the controller further configured to determine a frequency difference between the frequency of the first electromagnetic radiation and the first received electromagnetic radiation and determine a frequency difference between the frequency of second electromagnetic radiation and the second received electromagnetic radiation.

21. The light detection and ranging system of claim 19,
the controller further configured to determine a time difference between an emission timing of the first electromagnetic radiation and a detection timing of the first received electromagnetic radiation and determine a time difference between emission timing of the second electromagnetic radiation and the detection timing of the received electromagnetic radiation.

22. The light detection and ranging system of claim 19,
the controller further configured to control the electromagnetic radiation source to emit the first electromagnetic radiation and the second electromagnetic radiation at the same time.

23. The light detection and ranging system of claim 12,
wherein the at least one electromagnetic radiation source is configured to emit a first electromagnetic radiation of at least a first frequency or first frequency band and:
wherein the at least one electromagnetic radiation source is further configured to emit a second electromagnetic radiation of a second frequency or second frequency band, or further comprising a second electromagnetic radiation source coupled to the at least one light receiving input and configured to emit a second electromagnetic radiation of a second frequency or second frequency band;

further comprising a controller configured to control the electromagnetic radiation source(s) to:

emit the first electromagnetic radiation through the first and/or second light paths of the photonic integrated circuit to the outside of the light detection and ranging system and the second electromagnetic radiation through the first and/or second light paths of the photonic integrated circuit to the outside of the light detection and ranging system; and configured to control the first and/or second photo detectors to detect a first and/or second received electromagnetic radiation received through the first and second light path of the photonic integrated circuit from the outside of the light detection and ranging system.

24. A vehicle comprising a light detection and ranging system, the light detection and ranging system comprising:

a semiconductor photonic substrate having integrated therein:

at least one light receiving input;

at least one optical splitter to branch light received at the at least one light receiving input to a first light path and a second light path;

wherein the first light path of the semiconductor photonic substrate comprises:

at least one first amplifier structure to amplify the light in the first light path to provide first amplified light;

at least one first light output to output the first amplified light from the at least one first amplifier structure; and at least one first photo detector to receive light from the outside of a photonic integrated circuit, the at least one first photo detector being located next to the at least one first light output;

wherein the second light path of the semiconductor photonic substrate comprises:

at least one second amplifier structure to amplify the light in the second light path to provide second amplified light;

at least one second light output to output the second amplified light from the at least one second amplifier structure; and at least one second photo detector to receive light from the outside of the photonic integrated circuit, the at least one second photo detector being located next to the at least one second light output;

at least one electromagnetic radiation source coupled to the at least one light receiving input and configured to emit an electromagnetic radiation; and a grating structure optically arranged to guide light from the output of the plurality of the light paths to the outside of the light detection and ranging system and from the outside of the light detection and ranging system to a plurality of optical photo detectors.

25. The vehicle of claim 24, wherein the light detection and ranging system is configured for obstacle detection outside of the vehicle.

* * * * *